(12) United States Patent
Ohgi

(10) Patent No.: US 6,199,722 B1
(45) Date of Patent: Mar. 13, 2001

(54) ARTICLE PROVIDING APPARATUS CAPABLE OF BEING INSTALLED IN A SMALLER SITE

(75) Inventor: Tetsuhide Ohgi, Isesaki (JP)

(73) Assignee: Sanden Corporation (JP)

( * ) Notice: Subject to any disclaimer, the term of this patent is extended or adjusted under 35 U.S.C. 154(b) by 0 days.

(21) Appl. No.: 09/347,257

(22) Filed: Jul. 6, 1999

(30) Foreign Application Priority Data

Jul. 6, 1998 (JP) .................................................. 10-190259

(51) Int. Cl.[7] .................................................. B65G 59/00
(52) U.S. Cl. ........................ 221/123; 221/126; 221/133
(58) Field of Search ................................ 221/79, 87, 123, 221/126, 129, 130, 131, 133

(56) References Cited

U.S. PATENT DOCUMENTS

| | | | | |
|---|---|---|---|---|
| 3,087,648 | * | 4/1963 | Cope | 221/133 X |
| 4,995,498 | * | 2/1991 | Menke | 221/133 X |
| 6,047,855 | * | 4/2000 | Lin | 221/131 X |

FOREIGN PATENT DOCUMENTS

| | | | | |
|---|---|---|---|---|
| 52-43499 | * | 4/1977 | (JP) | 221/129 |
| 3189897 | * | 8/1991 | (JP) | 221/130 |
| 4241699 | * | 8/1992 | (JP) | 221/130 |
| 594582 | * | 4/1993 | (JP) | 221/130 |
| 6-3916 | | 1/1994 | (JP) | . |
| 6176260 | * | 6/1994 | (JP) | 221/129 |

* cited by examiner

Primary Examiner—David H. Bollinger
(74) Attorney, Agent, or Firm—Banner & Witcoff, Ltd.

(57) ABSTRACT

In an article providing apparatus, a storage rack (11) has at a front face thereof a loading portion for loading articles into the storage rack. A conveying robot (12) is movable right and left along a rear face of the storage rack. Responsive to a command produced in an operational unit (15), the conveying robot picks up, as a designated article, one of the articles rearwardly from the storage rack and conveys the designated article with movement thereof. A conveyor (13) is adjacent to a side face of the storage rack and receives the designated article from the conveying robot to convey the designated article forward. The operational unit is placed in front of the conveyor and receives the designated article from the conveyor.

5 Claims, 1 Drawing Sheet

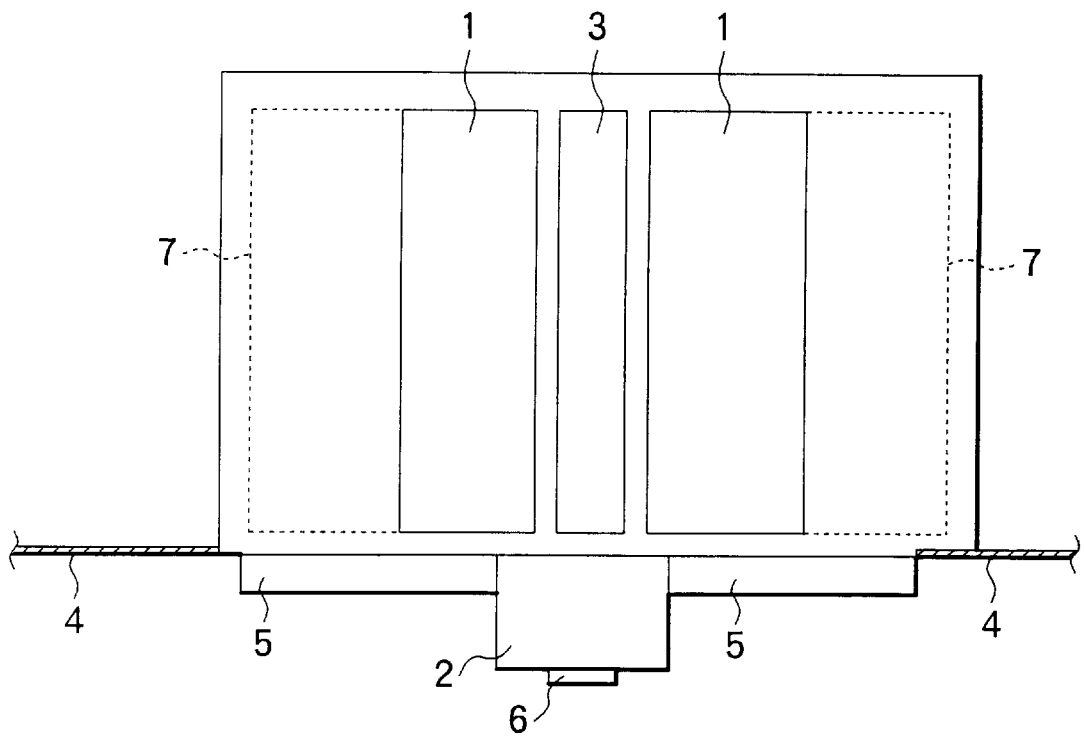
FIG. 1 EARLIER TECHNOLOGY
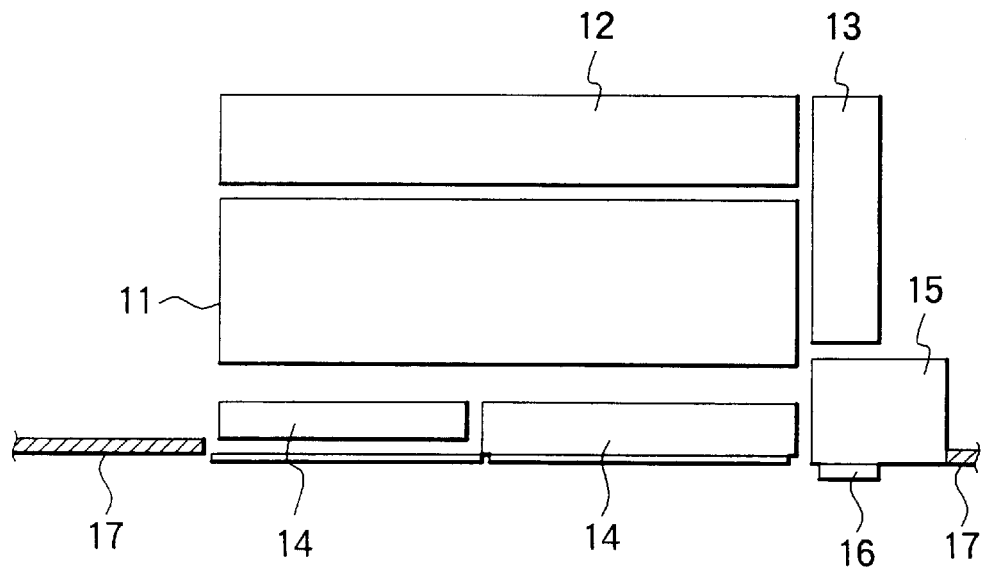
FIG. 2

ARTICLE PROVIDING APPARATUS CAPABLE OF BEING INSTALLED IN A SMALLER SITE

BACKGROUND OF THE INVENTION

The present invention relates to an article providing apparatus for storing articles and for discharging a selected one or ones of the articles in response to operation of an operational unit included in the article providing apparatus.

A conventional article providing apparatus is disclosed in, for example, Japanese Unexamined Utility Model Publication (JP-U) No. 06-3916. The conventional article providing apparatus comprises a storage rack for storing articles, a delivery port, and a conveyance means disposed along the storage rack for conveying a selected one of ones of the articles from the storage rack to the delivery port. The conventional article providing apparatus can handle a wide variety of articles by dividing the storage rack into many parts. Therefore, the realization of an unmanned retail store can be expected by applying the exist technique for automatic vending machines to the conventional apparatus to actualize an article providing apparatus or an automatic vending system.

FIG. 1 shows an article providing apparatus which has been already proposed as an earlier technology. The article providing apparatus comprises two storage racks 1 arranged right and left for storing articles, an operational unit 2 for being operated by a customer, a conveyance means 3 having a conveying robot which moves laterally and vertically along a space between the storage racks 1 for picking up the article from the storage racks 1 to convey the article to the operational unit 2, and sample showcases 5 which are immovably fixed to cover, in combination with partitions or doors 4, the front of the storage racks 1. The operational unit 2 has a delivery port 6 formed therein.

The operation for loading the articles into the each rack 1 is done at its side. For loading the articles, loading spaces 7 are provided on the sides of the respective racks 1.

However, the article providing apparatus of FIG. 1 has a serious problem of large installation area. That is, the loading spaces 7 are required large at the sides of the respective storage racks 1, thereby significantly increasing the installation areas as compared with conventional vending machines. Accordingly, there is less of suitable installation places, hence obstructing the spread.

SUMMARY OF THE INVENTION

It is therefore an object of the present invention to provide an article providing apparatus which is capable of being installed in a smaller site.

It is another object of the present invention to provide an article providing apparatus of the type described, which enables a large variety of articles to be handled within a small space.

Other objects of the present invention will become clear as the description proceeds.

According to the present invention, there is provided an article providing apparatus which includes a storage rack for storing articles therein, an operational unit for designating, as a designated article, one of the articles, and conveyance means for conveying the designated article from the storage rack to the operational unit. The storage rack has a front face, a rear face opposite to the front face, and side faces extending between the front and the rear faces and opposite to each other. The conveyance means comprises a conveying robot movable right and left along the rear face of the storage rack for picking up the designated article rearwardly from the storage rack and conveying the designated article with movement thereof and a conveyor adjacent to one of the side faces of the storage rack for receiving the designated article from the conveying robot to convey the designated article forward. The operational unit being placed in front of the conveyor to receive the designated article from the conveyor. The front face of the storage rack having a loading portion for loading the articles into the storage rack.

BRIEF DESCRIPTION OF THE DRAWING

FIG. 1 is a schematic top view of an article providing apparatus already proposed as an earlier technology; and FIG. 2 is a schematic top view of an article providing apparatus according to an embodiment of the present invention.

DESCRIPTION OF THE PREFERRED EMBODIMENT

With reference to FIG. 2, description will be made as regards an article providing apparatus according to an embodiment of the present invention.

The article providing apparatus of FIG. 2 comprises a storage rack 11 for storing articles and a conveying robot 12 disposed to face the back of the storage rack 11. The inside of the storage rack 11 is divided into many parts whereby a wide variety of articles can be stored. The conveying robot 12 moves vertically and laterally in response to a delivery command to pick up a designated article rearwardly from the storage rack 11 and convey the article along the back of the storage rack 11 to a side, e.g., to the right. A conveyor 13 is disposed adjacent to the right faces of the storage rack 1 and the conveying robot 12. The conveyor 13 receives the article from the conveying robot 12 and conveys the article forward. Herein, a combination of the conveying robot 12 and the conveyor 13 is referred to as a conveyance arrangement.

The storage rack 11 is structured to allow the operation of loading articles at the front thereof. A plurality of, i.e. two, sample showcases 14 are removably disposed in front of the storage rack 11. The sample showcases 14 are for showing a plurality of samples and are arranged right and left to completely cover the front of the storage rack 11. That is, the sample showcases 14 service also as a front cover of the storage rack 11. The sample showcases 14 are formed to be as small as possible in the depth direction, thereby making them slender.

An operational unit 15 whereby a customer operates the article providing apparatus for designating an article is disposed in front of the conveyor 13 and adjacent to the right face of the sample showcase 14. That is, the operational unit 15 is incorporated in a space at a front corner of the article providing apparatus. The operational unit 15 is provided with a delivery port (purchasing port) 16 formed in the front thereof. A reference numeral 17 designates partitions or the like.

The description will shortly be made as regards operation for loading the articles into the storage rack 11. Before loading articles, the respective sample showcases 14 are removed to open the front of the storage rack 11. In this condition, the articles are loaded through a loading portion or opening formed at the front of the storage rack 11. That is, the storage rack 11 has a front loading structure known in the art. After loading the articles, the sample showcases 14 are returned to the original positions to close the front of the storage rack 11.

The above-mentioned delivery command is produced in the operational unit 15 in accordance with the operation of an operator or customer. Responsive to the delivery command, the conveying robot 12 picks up a designated article rearwardly from the storage rack 11 and conveys the article to the right to transfer the article to the conveyor 13. The conveyor 13 conveys the article forward to feed it to the operational unit 15. Therefore, the operator or customer can obtain the article through the delivery port 16.

As described in the above, the respective function parts are effectively arranged, thereby reducing the area required for installing the article providing apparatus. Therefore, the article providing apparatus can be placed even in a small space where, for example, a conventional vending machine has been placed.

While the present invention has thus far been described in connection with a single embodiment thereof, it will readily be possible for those skilled in the art to put this invention into practice in various other manners. For example, the conveyor and the operational unit may be disposed adjacent to the left faces of the storage rack and the sample showcase. It is preferable that the sample showcases may be structured like sliding doors so that the showcases can slide to the sides or may be structured like hinged doors so that the showcases can pivot forward, thereby facilitating the opening closing operation for the front of the storage rack. One or both of the sample showcases may be an advertising board which can be opened and closed like a hinged door.

What is claimed is:

1. An article providing apparatus including a storage rack for storing articles therein, an operational unit for designating, as a designated article, one of said articles, and conveyance means for conveying said designated article from said storage rack to said operational unit, said storage rack having a front face, a rear face opposite to said front face, and side faces extending between said front and said rear faces and opposite to each other, said conveyance means comprising:

a conveying robot movable right and left along the rear face of said storage rack for picking up said designated article rearwardly from said storage rack and conveying said designated article with movement thereof; and a conveyor disposed in a side space beside said storage rack adjacent to one of the side faces of said storage rack for receiving said designated article from said conveying robot to convey said designated article forward through said side space beside said storage rack, said operational unit being placed in front of said conveyor to receive said designated article from said conveyor, the front face of said storage rack having a loading portion for loading said articles into said storage rack.

2. An article providing apparatus as claimed in claim 1, further comprising a sample showcase for showing a sample, said sample showcase being placed to cover the front face of said storage rack and being displaceable to enable said articles be loaded into said storage rack through the front face of said storage rack.

3. An article providing apparatus as claimed in claim 2, wherein said operational unit is placed in a space which is in front of said conveyor and adjacent to a side of said sample showcase.

4. An article providing apparatus as claimed in claim 3, wherein said operational unit has a front to which a delivery port is formed for delivering said designated article therethrough.

5. An article providing apparatus as claimed in any one of claims 1–4, wherein said storage rack is divided into a plurality of parts.

* * * * *